(12) United States Patent
Melen

(10) Patent No.: US 6,412,003 B1
(45) Date of Patent: Jun. 25, 2002

(54) SYSTEM AND A METHOD FOR ACCESSING SERVICES

(75) Inventor: Björn Melen, Espoo (FI)

(73) Assignee: Telefonaktiebolaget LM Ericsson (pub), Stockholm (SE)

( * ) Notice: Subject to any disclaimer, the term of this patent is extended or adjusted under 35 U.S.C. 154(b) by 0 days.

(21) Appl. No.: 09/297,696

(22) PCT Filed: Nov. 6, 1997

(86) PCT No.: PCT/FI97/00673
§ 371 (c)(1),
(2), (4) Date: Jul. 7, 1999

(87) PCT Pub. No.: WO98/20646
PCT Pub. Date: May 14, 1998

(30) Foreign Application Priority Data

Nov. 6, 1996 (FI) .................................................. 964469

(51) Int. Cl.⁷ .............................................. G06F 13/00
(52) U.S. Cl. ........................ 709/225; 709/238; 709/244
(58) Field of Search ................................. 709/225–228, 709/223, 238, 244; 705/40; 714/4; 379/88.17; 395/200.33; 370/401

(56) References Cited

U.S. PATENT DOCUMENTS

| | | | | |
|---|---|---|---|---|
| 5,774,662 A | * | 6/1998 | Sakagawa | 395/200.33 |
| 5,819,036 A | * | 10/1998 | Adams et al. | 395/200.33 |
| 5,991,746 A | * | 11/1999 | Wang | 705/40 |
| 6,014,753 A | * | 1/2000 | Miyamoto et al. | 714/4 |
| 6,178,455 B1 | * | 1/2001 | Schutte et al. | 709/228 |
| 6,215,858 B1 | * | 4/2001 | Bartholomew et al. | 379/88.17 |
| 6,249,523 B1 | * | 6/2001 | Hrastar et al. | 370/401 |

FOREIGN PATENT DOCUMENTS

| | | |
|---|---|---|
| EP | 0603 100 A2 | 6/1994 |
| EP | 0748 095 A2 | 12/1996 |
| EP | 0753 836 A3 | 1/1997 |
| EP | 0753 836 A2 | 1/1997 |
| EP | 0802 690 | 10/1997 |
| EP | 0825 746 A2 | 2/1998 |
| WO | WO 96/37848 | 11/1996 |
| WO | WO 97/29584 | 8/1997 |

* cited by examiner

*Primary Examiner*—David Wiley
(74) *Attorney, Agent, or Firm*—Jenkens & Gilchrist, P.C.

(57) ABSTRACT

A terminal (1, 2) connected to the public telephone network PSTN has access to the Internet-connecting node by dialling a service number. In the access node the server gives the terminal a temporary IP-address and sets up the connection to the area network (15) or to the worldwide Internet (11) offering chargeable services. In order to bind the A-number and the IP-address to each other and thus bill the user for the chargeable services the procedure is as follows: when setting up the connection to the service number, the telephone exchange (4), containing the intelligent network switching functions, informs the intelligent network Service Control Point (SCP) (14) of both the user's (1 or 2 ) A-number and the device location identification (C') of the telephone exchange (4) from which the connection has been setup to the router (6) entry point in the access node. The entry point is given the same identification (C') as the device location connected to the point, and a message is sent to SCP containing the temporary address given to the terminal for the connection time as well as the router (6) entry point identification. In SCP the billing program binds to each other the A-number and the terminal's temporary IP-address having the same device location identification and router entry point identification. The intelligent network database has the data of the providers of chargeable services, which data include at least their IP-addresses. When the terminal is connected to the chargeable service, the local area net server informs the IP-address of the service and the IP-address of the terminal to the Service Control Point (SCP).

17 Claims, 4 Drawing Sheets

ROUTING TABLE — 10

| Output | Segment |
|---|---|
| Default | 221 |
| 123.456.789.000 | 222 |
| 123.456.111.000 | 223 |

FIREWALL — 20

| IP's of the network terminals | Right | Segment |
|---|---|---|
| xxx.xxx.xxx.1 | A | 221 |
| xxx.xxx.xxx.1 | D | 222 |
| xxx.xxx.xxx.1 | D | 223 |
| xxx.xxx.xxx.2 | D | 221 |
| xxx.xxx.xxx.2 | A | 222 |
| xxx.xxx.xxx.2 | D | 223 |

SYSTEM AND A METHOD FOR ACCESSING SERVICES

FIELD OF THE INVENTION

The present invention relates to a system and a method for accessing and/or introducing different services through routers or switches, such as switches for IP, and a data transferring and billing method relating therein. The invention relates further to a routing segment.

BACKGROUND OF THE INVENTION

Various computer networks are known. There may also be a number of networks per se separate networks which are connected to each other by suitable interface means such as gateways, switches and/or routers.

In general, if the user is in a company, university or similar organization, the user is usually connected to the local area network of that local organization. He/she has a connection through appropriate routers or switches to a global computer network system called Internet. A home or private user may reserve his/hers own telephone line to be used by the telecommunications services through a company providing the necessary communications. The Internet includes several routers and/or switches for IP. The different services are accessed through so called segments included in the routers or switches.

The Internet services are used by client/server principle. In other words, a client program in the user's computer establishes a connection to a server program of a service provider existing in the network, whereafter the program is executed. The probably most used service is the electronic mail (e-mail), which can also be used by the private users after buying a personal mail box from the Internet connection provider. In this case the private user may retrieve messages from the server (post office) in the network to his/hers workstation by using POP protocol (Post Office Protocol).

The World Wide Web (WWW) has become as the most important service of the Internet. This is a world wide network of WWW servers which include hypertext documents (HTML documents). The WWW is a hyper media network, ie. it exists only virtually in an electronic form. The hyperdocument is one entity which may include text, pictures, sound, moving picture, programs etc. The document may comprise several pages. Some words or pictures among the text are links which are distinguishable in the screen, the activation whereof by clicking starts the transferring in an anchor of a link invisible to the user to the referenced URL (Uniform Resource Locator) address and brings a new document visible on the screen.

Each WWW server has a defined root which usually has a file which is intented to be viewed on the screen as first. This is generally called as home page. In addition to this, each subdirectory has a file which is the initial document of this file. It is possible to use the WWW by a graphical user interface, such as eg. Mosaic, Netscape and Cello, as well as by text based user interfaces, such as eg. Lynx. When a connection is desired through the Internet to any address, to another computer or to the WWW page, data is transferred via the networks and the routers and/or switches.

The machines using different programs and operation systems communicate with each other eg. by using TCP/IP protocol (Transport Control Protocol/Internet Protocol) which is a common naming for the two most important protocols of the Internet. The data to be transferred is divided into IP packets which are guided by routers operating in the network to the right destinations in accordance with address information included within the packets. The TCP ensures that a reliable communication will be maintained between the sender and the receiver. It collects the arriving IP packets into a correct order and, if needed, requests for a retransmission. In the router the packet is guided in accordance with a routing table to a correct segment and is transmitted forward. The table contains information about the IP address which are to be found behind each of the router segments. Updating occurs between the routers. Other possible protocols are UDP (User datagram Protocol), FTP (File Transfer Protocol), RPC (Remote Procedure call), ICMP (Internet Control Message Protocol), which is an extension of the IP.

The routers and switches for the IP are per se known by the skilled person. The following trade names can be given as an example of the switches for the IP: IP Switch (by IPSILON), Cell Switch Set Router (by Toshiba), Tag Switch (by Cisco), and ARIS (by IBM).

It is possible to add to the router or the switch for the IP an information indicating whether the user, ie. the sending IP address, has a right to sent information through some of the segments or not. In addition, the scope of destination IP address area or space and even a specific port for a certain application (service) in a destination host pointed out by the IP address may be included within the router or switch for the IP so as to define the user rights. If the right exists, the transmission is allowed to go out through the segment, and if not, the transmission is prevented. This is called as fire wall. The fire wall can also be provided such that some certain services are protected by determining the IP addresses and port numbers from which it is allowed to access and use said certain services. The service producer or the manager of the network may also take away the access right to a certain IP address.

SUMMARY OF THE INVENTION

The above described are all static ways of limiting the rights. If the user wishes to change the access possibilities, the only possibility for him/her is to make an agreement of it with the network manager or similar by means of a separate request, eg. by calling to the service provider or similar. The pricing of the services behind the router segment can be accomplished only in accordance with the services, such as the WWW pages, e-mail etc., relating to the precise segment.

The method and arrangement according to the present invention solves the problems of the prior art in a new and unambiguous manner.

It is an object of the invention to provide a system and a method for enabling an access to Internet and alike networks or parts thereof from the user's own computer by requesting rights from the holder of the rights or similar during the terminal session.

Another object of the invention is to provide services which can be selected by the user when needed during the terminal session and which he/she is able to change in accordance with the needs.

Another object of the invention is to provide a solution by which the connections used by the user can be charged, if necessary, in different manners.

A still another object of the invention is to provide a controller for the routers or switches for the IP which is capable of changing the settings of the routers or switches for the IP concerning that the address or service the user in enabled to access through the router or the switch.

Another additional object of the invention is to provide a possibility for charging the connections selected by the user by utilizing a control by an intelligent network.

Another additional object of the invention is to provide a data transfer system and method between users in different networks.

A still another additional object of the invention is to provide a possibility for distributing rights to the users to access through routers or switches for the IP eg. a certain group of services or an Intranet or another similar restricted group of services.

It is a further additional object of the invention to provide each of the users by a suitable default interface so that it is not necessary for the user to pay anything for such what he/she is not using, ie. there is an intention to a billing which operates in accordance with the exact actual use.

It is a further object of the invention to provide a possibility to use a service of a closed network to which the access of the user is prohibited by opening an originating or sending IP address and optionally a sending port number, and in some instances, if necessary, also a specific port to the destination IP address and even to a specific destination IP port.

Another additional object of the invention is also to provide a verification of the creditability or similar acceptability condition of the user before giving the service to be used by the user.

To obtain the above objects, the present invention provides a new and unambiguous system for transferring information. Said system comprises computer networks to which one computer or several computers is/are connected to, routers or switches between the computer networks so as to provide communications between the computer networks, user interfaces connected to the computer networks through a router or a switch of a connection provider, wherein each of the computers connected to the networks has an IP address of it's own or a similar identification from which it is possible to identify the transmitting and receiving computer, router controller servers having a connection to at least one desired router or switch for IP, the user thereof having an access to various addresses in an address space of the computer network router or switch, the access right thereof being defined in accordance with a table, wherein the user has, during the connection to the router or switch and the router controller server, a right to change at least one or several allowed access right(s) of the address space defining the table.

According to an alternative, a system for transferring information comprises computer networks to which one computer or several computers is/are connected to, routers or switches between the computer networks so as to provide communications between the computer networks, analog subscriber subscriptions of a switched network connected to the computer networks, which are connected to a corresponding router or switch, each of the connected computers having an IP address of it's own or a similar identification from which it is possible to identify the transmitting and receiving computer, router controllers having a connection to the router or switch which is the closest one to the local network of the service provider through which the user has an access to the services, and by means of which the access rights of the routers or switches to certain address are changed such that as the user contacts the router controller and announces his/hers willingness to a certain address the user's rights to access addresses in the router or switch are changed accordingly.

The invention provides also a routing table including information about user's IP addresses, router or switch segments and a column including an information about the user's current status in accesses to addresses, ie. through which router segment the user is able to establish connections and through which segment the user is not able to establish connections.

A method for transferring information is also disclosed. Said method is used in a system which comprises computer networks to which one computer or several computers is/are connected to, routers or switches between the computer networks so as to provide communications between the computer networks, user interfaces associated with the computer networks which are connected to a corresponding router or switch, wherein each of the computers has an IP address of it's own or a similar identification from which it is possible to identify the transmitting and receiving computer, router controllers having a connection to the router or switch and by which it is possible to change the access rights of the routers or switches to certain addresses. Said method comprises the steps of contacting the router, contacting the router server, announcing an information about the desired address space through the user connection, changing the access right criteria of the number space defined by a table, and registering the change.

One alternative embodiment of the invention provides a system for changing router access rights in a system comprising computer networks to which one computer or several computers is/are connected to, routers or switches between the computer networks so as to provide communications between the computer networks, user interfaces connected to the computer networks through a router or switch of a connection provider, wherein each of the computers connected to the networks has an IP address of it's own or a similar identification from which it is possible to identify the transmitting and receiving computer, router controller servers having a connection to at least one desired router or switch, the user of which has an access to various addresses in an address space of the computer network router or switch, the access right thereof being defined in accordance with a table, wherein the user has, during the connection to the router or the switch and the router controller server, a right to change at least one or several allowed access right(s) of the address space defining the table, in which system a client program is retrieved from the router server to the user's computer, the user computer communicates by means of the program with the server, the server gives the alternatives for number spaces, the user selects a number space, the server updates an IP fire wall information of the router or the switch, the updating information is selectively transmitted to a billing system (from the used IP address space), and the connection to the server is closed after the change or changes.

To change the fire wall information of a router or a switch for IP it is invented that the information, for instance in a router segment or in a switch for IP switching, which prevents the user from being able to send any information or data, is changed eg. by means of a controller of the router or switch segments. When the user wants to have another connections, he/she announces to the controller that he/she needs a right to another segment or similar. The user may be automatically provided with an announcement that he/she has selected an address to which he/she is not entitled to have an access, whereafter the user may be given instructions how to act to activate the access.

The right of the user to the network behind a predefined segment may be verified. This function is useful in cases when the network behind the router or switch is eg. an university network into which the students are the only ones having a right to access. The connection information may be registered, and the maintainer of the network, eg. an operator, may receive an announcement about that to a billing program or a billing data base eg. by means of an intelligent network (IN). By means of this it is possible to obtain an arrangement in which there is no need for the user to take any connections to the maintainer of the network and to make a separate agreement of the connections he/she wants to have. In a normal case it has been necessary for the user to make such an agreement with the maintainer of the network by making a telephone call and requesting a permission to shift himself to be an user of a certain address. In the invention the user may change the profile of the addresses he/she wishes to have a connection during the same connection. There is no need for the user to log out, and the used programs may be in use for the entire length of the session.

As was discussed, it has been possible to add to the router or the switch for the IP an information indicating whether the user, ie. the sending IP address, has a right to sent information through some of the segments or not. However, by means of the invention its also possible to implement an information concerning the scope of destination IP address area or space and even a specific port for a certain application (service) in a destination host pointed out by the IP address within the router or switch for the IP so as to define the user rights. By means of this a more complete dynamic firewall is provided.

It is to be noted that the terms 'router controller' and 'routing control server' are intented to mean all such means which are used for controlling the operations of the router or the switch for the IP switching in accordance with the principles of the present invention.

The additional features of the invention and the advantages obtained by it are evident from the description and the drawing. It is to be noted that the invention is not intented to be limited to the following examples, but is intented to cover all such modifications and variations which fall within the spirit and scope of the present invention as defined in the appended claims.

A BRIEF DESCRIPTION OF THE DRAWING

A DETAILED DESCRIPTION OF THE DRAWING

Figure 1:
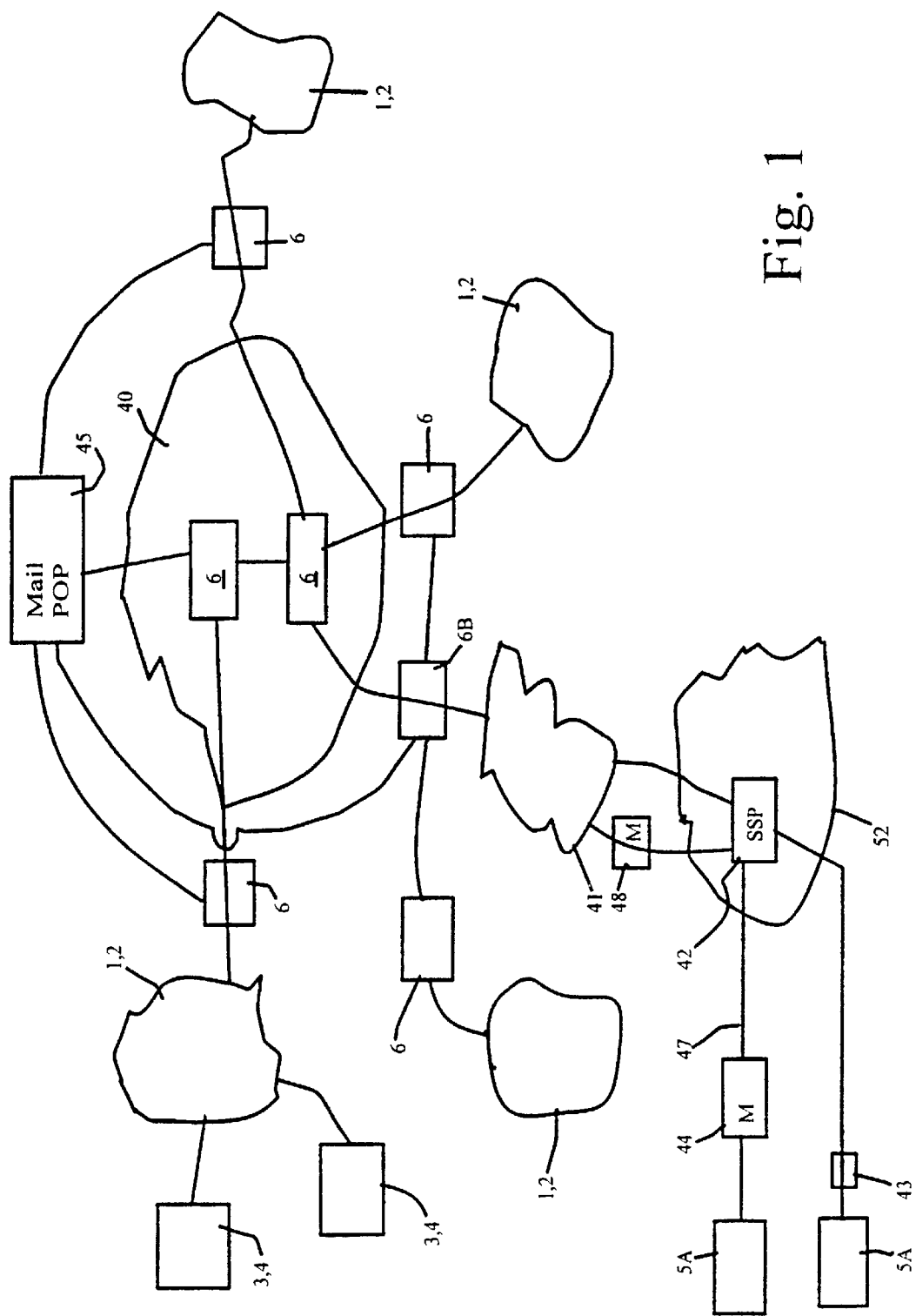
FIG. 1 is a schematic presentation of an Internet network including local area networks and routers.

FIG. 1 discloses a schematical illustration of computer networks, wherein be a number of local networks are connected to each other. More precisely, FIG. 1 discloses an Internet network consisting of a plurality of computer networks 1, 2 to which one or several computers 3,4 are connected to. Between the computer networks there are routers 6, switching points, node points for transferring the bit information to correct addresses and for providing communications between the computer networks.

Figure 3A:
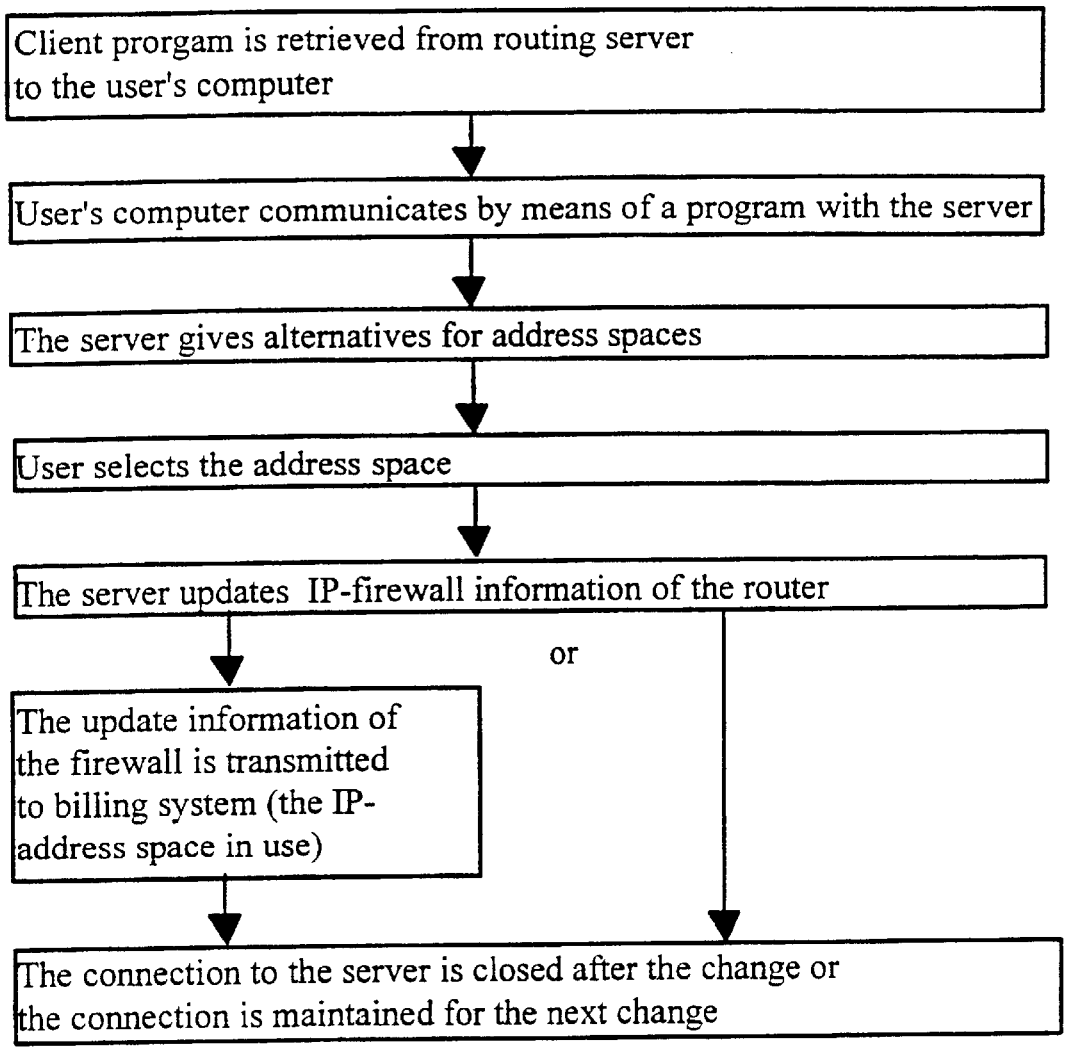
FIGS. 3a and 3b are block diagrams of the measures for changing the design values of the routing tables and for removing the connection in accordance with the invention.
Figure 3B:
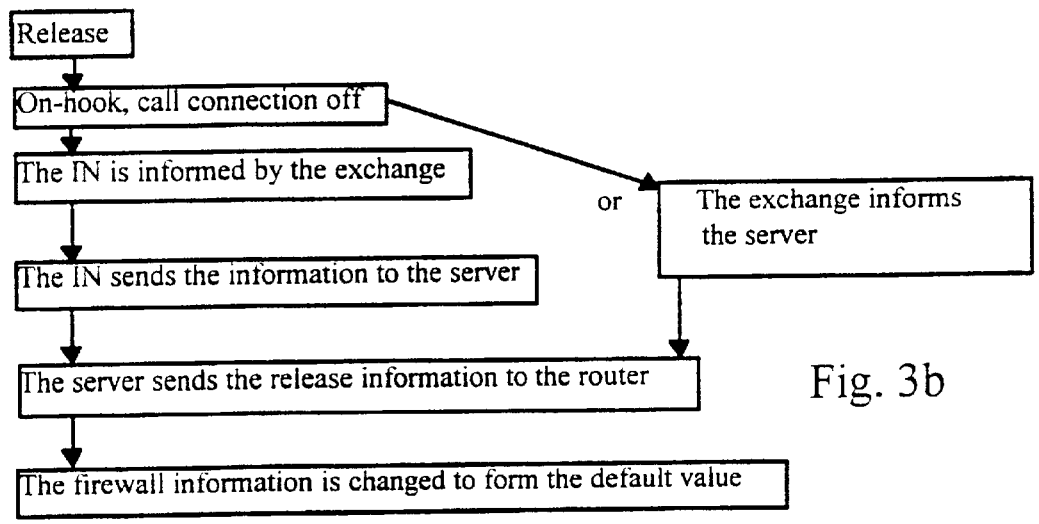

Each of the computers to be connected to the network has it's own IP address or a similar identification, from which it is possible to identify the transmitting and receiving computer. Analog subscriber subscriptions 5A of a switched network connected to a corresponding router 6, 6B are interfacing to the computer networks from router controllers, by means of which it is possible to change the user right of certain addresses or address spaces of the user routers 6, 6B, such that the user contacts the router controller 56 and announces his/hers willingness to a certain address, as is disclosed by FIG. 3a. The possibility for the user to access the router addresses is changed so that it is possible for him/her to access the address. The release procedure of the connection is disclosed by FIG. 3b.

The information is transferred in the network as packets having a bit form, each of them including eg. the source address of the sending device and the target address of the receiving device. The router reads the address information and guides the packets ahead to a correct direction. The routers maintain routing tables and they change information with each other about the address areas so that the address tables are updated in certain intervals for finding the address.

Even though FIG. 1 discloses only some routers, computers and local networks, it is to be understood that there may be a substantially larger number of these. Even though it is not disclosed in the figure, it is clear that it contains exchanges and switches of a telephone network, which are connecting the calls between two remote subscribers 5A and a connection node 41. As already explained, the routers can be replaced by some other suitable means for routing/switching, such as by the switches for the IP.

Figure 2:
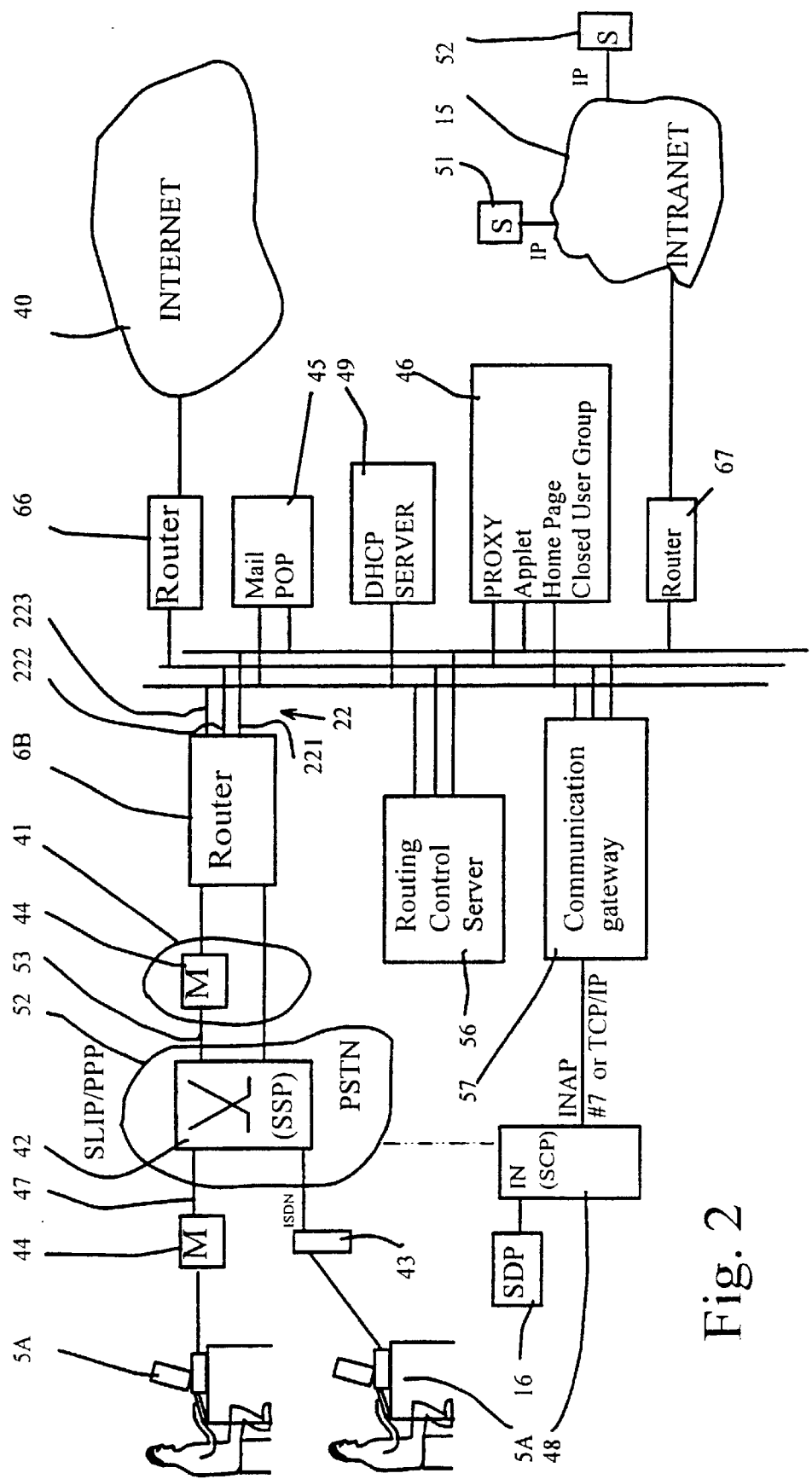
FIG. 2 is a schematic presentation of one solution utilized in the invention.

As is disclosed by FIG. 2, there is a connection from the telephone exchange(s) to an intelligent network (IN), which consists of, among other things, a SSP (Service Switching Point) 42, a SCP (Service Control Point) 48 and a SDP (Service Data Point) 16, the signalling between them being a common channel signalling SS7. Communication gateway 57 illustrates the coaptation of the connection between the datanetwork and the telephone exchange, the INAP is an Intelligent Network Application Part.

A table is formed into the SDP 16, said table containing the information of a subscription which has joined the service and some possible further information, such as creditability information, which can be verified during the connections. The connection between the subscriptions and the exchange may be a fixed line or a wireless connection. The intelligent network is recognized in the exchanges from a certain number which is predefined from the first part thereof so that it is possible to direct the information included therein from the user interface 5A to the selected desired intelligent network. It is also possible to call to the connections provider's modem number. If it is desired, it is possible to connect to the IN through a router server.

A group which is formed by the local networks and which cannot be accessed outside is sometimes called as Intranet. A normal home user does not have a local network which is to be connected to the Internet or an internet, but in accordance with FIG. 1 the user 5A may access through a public telephone network (PSTN) 52 to a local network 41 of some Internet connection organization. This can be accomplished either from an ISDN subscriber interface of the exchange 42 by a computer 5A provided with an ISDN adapter 43 or from an analog subscriber interface of the exchange 42 via a modem 48 by means of an interface connected to a serial port (RS232 or so called COM port) of the computer. The establishing of the communications occurs such that the communications program of the computer 5A establishes a connection to the routing controller which operates as a DHCP server. It is also possible to use a Radius server. The computer 5A may also have an own fixed IP address.

The connections of the local network and thus also the connections of the users to the Internet world 40 pass through the routers 6B and 66. The user 5A has an access to the world wide Internet network (WAN) 40 and a subnetwork or Metropolitan Area Network (MAN) 15, covering a geographically limited area, such as a city, via a switching node providing the switching service. Only two users are shown in the figure, but there may, of course, be a plurality of users and as is shown, the users may be either modem users or ISDN users.

The following will describe a portion of FIG. 2 in which the information of an user may be used for pricing of the services or connections by selecting a certain address. Switched to the subnetwork 15 are the service providers 51 and 52, a part of them providing services which are free of charge. On the other hand the services or service instances of some of the service providers (S) 51, 52 are subjected to charges. Those telephone numbers by means of which it is possible to utilize the chargeable services in accordance with the present invention are registered into the database SDP 16 of the intelligent network IN as a number space. An access is provided from these telephone numbers to such numbers (B-numbers) of the service provider which function as triggers for the intelligent network. When desired, the number of those users who have a right to use the service may be limited by setting the service access criteria to be based on the geographical location of the user (A-number). For instance, when ordering a pizza this may be defined by the distribution area or the home delivery area. The information about the service providers, possible access criterions and charges for the service instances may be stored into the database SDP (Service data Point) 16 of the intelligent network 48.

FIGS. 1 and 2 disclose that the important component in the local network is a computer 45 handling the electronic mail traffic of the users, from which the computers 3, 4 and 5A may retrieve their electronic mail by using POP protocol (Post Office Protocol).

Another important local network component is a local PROXY server 46. The PROXY server 46 may also be located behind the router 66 in the Internet network. The PROXY server 46 operates as a cache memory for the network services and also as a gateway between the local network 41 and the Internet 40. It stores into it's memory eg. the most recently from the Internet retrieved files or WWW pages, wherefrom the users in the same PROXY server 46 can then quickly reread them into their own machines 3, 4, 5A.

In order to enable the user, who has attached his/hers machine 5A through a modem (M) 44 to an ordinary telephone line 47, to use graphical client programs and a WWW browser, a SLIP protocol (Serial Line Internet Protocol) or a PPP protocol (Point to Point Protocol) is used in the data transfer between the user 5A and the local network 42. The protocol converts the modem line 47 into an Internet cable and extends the TCP/IP telecommunications connection of the Internet to pass over an ordinary telephone line from the modem 44, 48 to another, in the figure between the terminal device 5A and the local network or the interface node 41. The SLIP protocol enables an Internet communications by means of the serial port of the computer, whereby the computer behind a serial interface can be seen as one workstation 5A connected to the network 41.

The IP addresses behind the segments of the router can be selected depending on that how the use thereof should be charged. According to one preferred embodiment the user, ie. A-subscriber, may call by the modem 44 or by means of an ISDN adapter 43 from his/hers subscription 5A to the interface node 41, ie. to a telephone number of the connection provider company providing the interface service, which in this case is the B-number. The A-number and the B-number are transferred from the telephone exchange 42, which is also a Service Switching Point SSP of the IN service of the intelligent network, to the intelligent network to a Service Control Point SCP 48 to be used by a billing program or similar arrangement, which forms a billing record or data base for the A-subscriber including the A and B numbers. The intelligent network informs the exchange about the reconnection of the call to a number C defined for the service provider, if the calling A-number is entitled to this service.

In other case a congestion is given to the A-subscriber. This function can be utilized so as to fulfill possible regulations concerning limitations to the services. According to a such regulation the subscriber must have eg. a possibility to restrict the use of the telephone to ordinary basic calls only and to prevent the use of another services.

The telephone exchange 42 accomplishes the connection to a device location C' corresponding the C-number, ie. reserves a time slot, and announces the identification of the device location C' to the intelligent network 48. The device location identification C' is attached to the billing record, whereafter the intelligent network 16, 48 knows the A-number, the B-number and the device location identification C'.

The call leaves in a per se known manner from the device location C' of the exchange 42, 52 and comes to an input port 53 connecting the interface node 41 to the PSTN network. The port 53 and the device location 55 of the exchange correspond "one-to-one" to each other, so it is, for the clarity reasons, possible to use the same device location 55 identification as in the telephone exchange 42, ie. the identification C', as a number for the port 53. From the port 53 the call forwards to a server/router 6B, 41 of the connection company designated by the B-number, which server/router is now aware of the identification C' of the device location 55 in the exchange 42, from which the call originates.

The server/router 6B, 41 gives, in a normal manner, an Internet address IP1 to be used during the connection to the calling computer "visible" behind this device location. Both the device location identification C' and the given Internet address IP1 are announced to the intelligent network 16, 48 including the billing program, which has already received the A-number and the device location C'. The intelligent network combines the received information including the same device location 55 identification C' and obtains as a result a knowledge of the A-number and the IP1 address given to it and the necessary time information for a Toll-Ticket (TT) record. The user is now enabled to move in various networks according to his/hers selections. According to the information in the routing table 10 of the router the user has a default value indicating that the user is initially connected through the interface node 41 to a local network MAN 15 providing Internet services and that the user operates in accordance with the agreed payments and rules within the area of this network. As the A-number of the user is known, the billing may occur also on basis of the A-number. In the local network 15 the intelligent network knows the database concerning the providers of the services liable for charges.

Since the Internet and the local network are usually behind different segments, the user has to ask for a permission to be able to shift inside the Internet network 40 from the control server 56 of the router. After the user has received the permission to start to use the services of the Internet network 40, the server 56 informs the intelligent network 16, 48 about the change in the connection information, ie. the change of the segment 22, which is updated according to the IP-address information and is combined with eg. the A-number information of the user. Correspondingly, as the user returns to use the services within the area of the MAN network 15, the connection node 41 informs the intelligent network 16, 48 about the shifting back to the area network MAN 15. The routing server 56 is usually attached only to the default segment.

An information about changes in the router concerning the user rights can also be added to the billing information. The notification of the segment used by the user is given to the A-number information. Thus it is possible to know what segment the user is currently using. This is only one possibility to accomplish the billing. It is possible to collect information about the segments 22 used by the user into the router control server 56, which is announced either along the same connection path or then there is a telecommunications connection from the server to the intelligent network 16, 48, for example according to signalling system (SS) #7 (or TCP/IP) and INAP protocol (Intelligent Network Application Protocol).

The router segments 22 may consist of Internet addresses 40, addresses of a local network of an university, city's own addresses, intranet addresses 41 in various segments or behind the router segment, electronic mail 45, etc. When the user wishes to access to a certain segment 22 in the telecommunications network, into which he/she otherwise has not had a possibility to access, he contacts to the routing control server by starting a known client program (a small program which is used in the Internet applications and which is programmed eg. by Java™, which is an object based, device independent C++ language type programming language compatible with various protocols). The Client is a computer system or process which requests a service of another computer system or process. When the user has activated the Client including the information of the desired segment 22, it contacts the router controller 56 which transmits back a notification of eg. changes in billing information and user instructions. A window is opened on the user's screen which gives a notification about the changes in the billing information. The user can accept these, whereafter the router controller server 56 changes the segment 22 access instructions of the router 6B and sends an announcement about the accomplished changes. Thereafter the user may start to take connections to the addresses within the area of the selected segment 22.

The announcement or announcements of the implementations of the segment 22 are given at the same time, which are then collected to the billing information or to some other analyzing information. An usually collected information may include the IP address 21 of the user, information about the segment, such as the number of the segment of the router 22 or the user's IP addresses to which he/she contacts, the starting and endings times of the connection, such as in the Toll-ticket record. The router controller server 56 or a router 6B in general may also contain information about the addresses or segments to which the user rights are limited. Thus the user rights to the addresses can be restricted beforehand, which is already done at present as well. The router controller server 56 is a computer including a memory (ROM and RAM), a central processing unit and I/O devices having a connection therebetween. The server 56 is connected to the service provider router 6B.

In the beginning the user 5A has a connection as a default to eg. the electronic mail which can be found from one of the segments 221. When he/she wishes to extend his/hers usage to other services, he/she may request from the router controller server 56 that he/she wishes an access to eg. an Internet connection 40. At this stage the user initiates the client (/server) program in a similar manner as above and announces which of the segments 222 he/she wishes to access or announces an address to which he/she wishes to enter, and the router controller server 56 accomplishes the necessary updating information into the router 6B so as to enable the user to contact to the desired segment 222 or a segment which includes the desired address.

Figures 4, 5, 6:
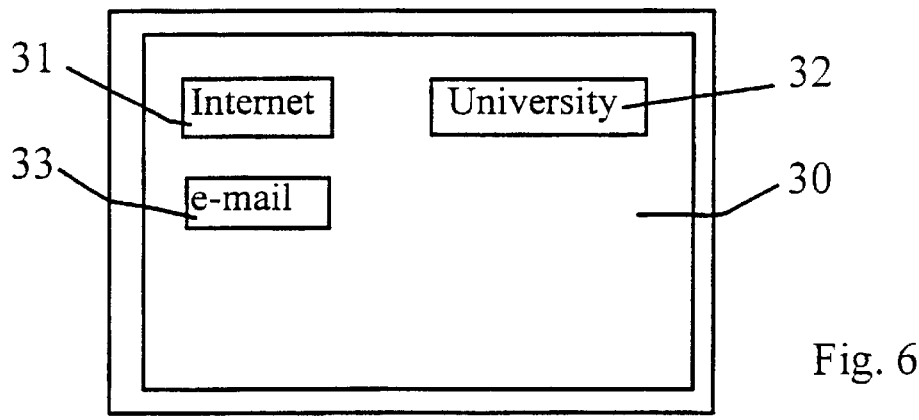
FIG. 4 is an example of a routing table.
FIG. 5 is an example of another routing table.
FIG. 6 is an example of the user menu for selecting the segments of the router.

FIG. 4 discloses one example of the routing tables 10 included in the router 6B. The routing tables contains a table 10 which contains columns 11, 12 which give the information of the particular addresses which can be found behind each particular router addresses segment 22, eg. default of the user IP1 can be found behind the router segment 221 where the user always has a connection. The addresses of the segment 123.456.789.000 can be accessed through the router segment 222. The addresses of the segment 123.456.111.000 can be accessed through the router segment 223. The user has only an optional right to the addresses which are behind segments 222, 223.

FIG. 5 discloses another table 20 in the router, which shows the current state of the access rights of the user to the addresses, ie. through which router segment 22 the user is enabled to take connections and through which segment 22 he/she is not enabled to take any connections. A table has been formed of the IP addresses 21 of the users which consists of the IP address of the user 21, the router segments 22 and a column 23 defining the user's access rights to the segment concerned (A=accepted, D=denied). In table 20, the user IP1 has an access to the addresses of the segment 221 but he/she has no access to the addresses of the segments 222 and 223, whereas the user IP2 has an access to the addresses of the segment 222 but no access to the addresses of the segments 221 and 223.

According to one alternative (not shown) the table may optionally contain the sending IP addresses, the numbers of the sending ports, the destination IP addresses and even the destination ports, or similar information of various addresses and ports.

When the Client/server program is retrieved to the PC or the workstation of the user, it is started by clicking by an arrow using a mouse or similar. After the program has been started it retrieves the necessary information from the server 56 and what will be seen by the user in this case is that a menu 30 is opened on the user's screen from which the user may select the desired option(s) to enable an access to the addresses behind the segments 221, 222, 223 of the different routers.

An example of the design of the menu 30 is illustrated by FIG. 6, in which the menu contains Internet 31, network of an university 32, electronic mail 33. The router has a controlled access to all of these. When selecting the Internet 31, it enables the user IP1 to access the Internet network 40, wherein the access is provided via router segment 222. Those addresses or addresses of the segments to which the user already has an access may have been changed in the menu as inactive so that they will not become selected. The menu or similar means may become visible automatically on the user screen as soon as the user has, for example, selected an address which belongs to the addresses 222, 223 behind that segment of the router of the user the user IP1 does not have a right at that moment. Thus the Client/server program will start without a need to separately start the client/server window.

According to one embodiment a possibility to open an originating IP address and, when necessary, a possibility to open a specific port to the destination IP address and even a specific port (port number) therein is provided. This possibility enables an user to use a service from such service provider whose server is within such address area to which an access right scope controller has otherwise limited or prohibited the access of that particular user. In this context the access right scope controller is intented to mean operationally the same as are the router or switch for the IP switching in accordance with the present invention.

According to this form only a certain predefined Application from the USer's device or a certain predefined Applet which contacts a predefined port of a predefined IP address of the service provider's server machine is allowed to get through. From the user's side this is a transparent operation, and the user sees this service in a similar manner as it would be provided from the same limited service address area to which he/she has the actual right to access. In other words, the user may access a service provided in such a closed network (such as Intranet) he/she otherwise could not access, and in which network he/she does not have any user or access rights.

This "hole" or "path" within the scope controller is opened either by a request from the precise Application or Applet which calls for the service, or when using some Service Broker for distributing the service, this broker opens the path simultaneously as it distributes the Applet by means of which it is possible to access the service. This hole or path is closed when the Applet is closed or when the user leaves the Application.

In case there is a need to define this connection even more precisely, then the originating (sending) port is also defined. This originating port is thus defined in the table as having an access right to the destination IP and/or destination port.

This kind of path enables also a provision of different services from the same server to different users by defining an individual profile for each of the users. This enables, for instance, a provision of different kinds and amounts of information depending eg. of type of service agreements between various Clients and various service providers.

Even though the above describes eg. the contacting of the router server 56 by means of the Client/server principle, it can be noted that the contacting may be realized in other manners as well, but that the Client/server principle is one of the most user friendly implementations. It is possible to inform the IN separately from the selections of the segment without releasing the connection. The connections from the exchange to the local network are data connections, eg. Ethernet connections, as they may also be from the local network to the internet, routers and servers etc. In addition, the other alternatives evident for the skilled person can be used without departing from the scope of the following claims.

What is claimed is:

1. A system for transferring information, said system comprising computer networks to which at least one computer is connected, routers or switches between the computer networks so as to provide communications between the computer networks, user interfaces connected to the computer networks through a router or switch of a connection provider, each of the computers connected to the computer networks having an identifier from which it is possible to identify the transmitting and receiving computer, router controller servers having a connection to at least one desired router or switch, the user thereof having access to various addresses in an address space of the computer network router or switch, the access right thereof being defined in accordance with a table, wherein the user has, during the connection to the router or switch and the router controller server, a right to change at least one allowed access right of the address space defining the table.

2. The system according to claim 1, wherein said address space is divided into segments, each segment providing an access to a certain group of addresses.

3. The system according to claim 2, wherein an announcement or announcements thereof are provided to at least one of a billing information arrangement and information analyzing arrangement as a segment is implemented.

4. The system according to claim 3, wherein in a system comprising a public telephone network, an interface node which can be accessed from a terminal connected to the public telephone network, and at least one telecommunications network providing services which can be accessed from the interface node, in order to form billing basis for the use of services:

the interface node is adapted to give to the terminal a temporary or a fixed address for the duration of the connection when establishing the connection to the interface node, a telephone exchange, which includes intelligent network switching functions, and the router controller server correspondingly are adapted to give an announcement to the Service Control Point (SCP) of the intelligent network concerning the A-number of the user, the concerned device location identification and the segment currently in use of the telephone exchange from which the connection has been established to an input port of the interface node, the input port is given the same identification as the device location connected to the port, and a message is transmitted to the Service Control Point (SCP) including information about the segment, the temporary address given to the terminal for the duration of the connection and the identification of the input port of the interface node, and the A-number and the temporary address, which have the same relating device location identification, the interface node input port identification, and the segment currently in use announced by the router controller server are bonded together.

5. The system according to claim 4, wherein as the user moves from a service group defining a certain number space to another group, the router controller server sends information to the intelligent network indicating that the user has moved to use another service which is outside the group defining the certain number space, which is behind a different segment of the router or switch.

6. The system according to claim 1, wherein the following is collected into billing information:

the IP address of the user and information about the segment.

7. The system according to claim 6, wherein the information about the segment comprises at least one of the number of the router segment, the IP addresses to which the user is making contacts, and the starting and ending times of the connections of the segments of each of the routers.

8. The system according to claim 1, wherein the router controller server contains information concerning the addresses or segments to which the user rights are restricted.

9. The system according to claim 1, wherein as the user logs into the connection provider's network, the user has a default connection to an electronic mail which is positioned in one segment behind a certain segment of the router or segment.

10. The system according to claim 1, wherein the router or switch contains information indicative of the addresses or segments to which the user rights are restricted.

11. A system for transferring information, said system comprising computer networks to which at least one computer is connected, routers or switches between the computer networks providing communications between the computer networks, analog subscriber subscriptions of a switched network connected to the computer networks, which are connected to a corresponding router or switch, each of the computers connected to the network having an identifier from which it is possible to identify the transmitting and receiving computer, router controllers having a connection to the router or switch which is closest to the local network of the service provider through which a user has access to services, and by means of which the access rights of the routers or switches to certain address are changed such that as the user contacts the router controller and announces his/her willingness to access a certain address, the user's rights to access addresses in the router or switch becomes changed accordingly.

12. A routing table comprising information indicative of user IP addresses, information indicative of the addresses of router or switch segments and information indicative of the user's current status to access addresses through which segment the user is able to establish connections and through which segment the user is not able to establish connections, the information indicative of the user's current status to access addresses being selectively alterable by the user.

13. The routing table according to claim 12, wherein the table further comprises at least one of the following information: sending IP addresses, numbers of the sending ports, destination IP addresses, and the destination ports.

14. A method for transferring information in a system comprising computer networks to which at least one computer is connected, routers or switches between the computer networks providing communications between the computer networks, user interfaces associated with the computer networks, said user interfaces being connected to a corresponding router or switch, each of the computers having an identifier from which it is possible to identify the transmitting and receiving computer, and router controller servers having a connection to the router or switch by means of which it is possible to change the access rights of the routers or switches to certain addresses, said method comprising the steps of:

contacting the router or switch, contacting the router controller server, announcing an information about the desired address space through the user connection, changing the access right criteria of the number space defined by a table in response to the information, and registering the change.

15. The method according to claim 14, wherein the change is registered through at least one of the user connection and through a separate connection from the server to a billing database.

16. A system for changing router or switch access rights in a system comprising computer networks to which at least one computer is connected, routers or switches between the computer networks providing communications between the computer networks, user interfaces connected to the computer networks through a router or switch of a connection provider, each of the computers connected to the networks having an identifier from which it is possible to identify the transmitting and receiving computer, router controller servers having a connection to at least one desired router or switch, a user of which having access to various addresses in an address space of the computer network router or switch, the access right thereof being defined in accordance with a table, the user having, during the connection to the router or the switch and the router controller server, a right to change at least one allowed access right of the address space defined in the table, in which system a client program is retrieved from the router controller server to the user's computer, the user computer communicating by means of the client program with the router controller server, the server providing the alternatives for number spaces, the user selecting a desired number space, the server updating IP fire wall information of the router or the switch, the updating information being selectively transmitted to a billing system from the used IP address space, and the connection to the router controller server being closed after the change.

17. The system according to claim 16, wherein the router controller server controls the user information of the particular router or switch through which the user can be connected to different service segments.

* * * * *